(12) United States Patent  
Cervantes et al.

(10) Patent No.: US 7,512,735 B2
(45) Date of Patent: Mar. 31, 2009

(54) APPARATUS AND METHOD TO CONTROL ACCESS TO LOGICAL VOLUMES

(75) Inventors: Ezequiel Cervantes, Tucson, AZ (US);
Juan A. Coronado, Tucson, AZ (US);
Miguel A. Duanas, Tucson, AZ (US);
David P. Goodman, Loveland, CO (US);
Matthew J. Kalos, Tucson, AZ (US);
Donald M. Nordahl, Tucson, AZ (US);
Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 10/719,488

(22) Filed: Nov. 20, 2003

(65) Prior Publication Data
US 2005/0114624 A1    May 26, 2005

(51) Int. Cl.
*G06F 12/00* (2006.01)
(52) U.S. Cl. .................................................. 711/113
(58) Field of Classification Search ............... 711/112, 711/114, 206, 152, 113
See application file for complete search history.

(56) References Cited

U.S. PATENT DOCUMENTS

| | | | |
|---|---|---|---|
| 5,970,030 A | 10/1999 | Dimitri et al. | |
| 6,269,423 B1 | 7/2001 | Kishi | |
| 6,438,648 B1 * | 8/2002 | McKean et al. | 711/114 |
| 6,633,962 B1 * | 10/2003 | Burton et al. | 711/163 |
| 6,922,762 B2 * | 7/2005 | Hirakawa et al. | 711/162 |
| 7,103,665 B2 * | 9/2006 | Shinohara et al. | 709/226 |
| 2003/0055972 A1 * | 3/2003 | Fuller et al. | 709/226 |
| 2003/0149763 A1 * | 8/2003 | Heitman et al. | 709/224 |
| 2003/0172239 A1 * | 9/2003 | Swank | 711/163 |
| 2003/0217305 A1 * | 11/2003 | Krehbiel et al. | 714/6 |
| 2004/0054866 A1 * | 3/2004 | Blumenau et al. | 711/202 |

* cited by examiner

*Primary Examiner*—Matt Kim
*Assistant Examiner*—Ryan Dare
(74) *Attorney, Agent, or Firm*—Dale F. Regelman; Quarles & Brady LLP (57) ABSTRACT

A method to control access to logical volumes. The method provides a plurality of host computers and an information storage and retrieval system comprising a plurality of logical volumes. The method forms (N) host computer groups, assigns one or more of the host computers to the (i)th host computer group, such that each host computer assigned to (i)th host computer group is not assigned to any other of the (N) host computer groups. The method forms (N) logical volume groups, assigns one or more logical volumes to the (i)th logical volume group, such that each of the logical volumes assigned to the (i)th logical volume group is not assigned to any other of the (N) logical volume groups. The method maintains a database associating the (i)th host computer group with the (i)th logical volume group, and permits a host computer assigned to the (i)th host computer group to access a logical volume assigned to the (i)th logical volume group.

26 Claims, 6 Drawing Sheets

APPARATUS AND METHOD TO CONTROL ACCESS TO LOGICAL VOLUMES

FIELD OF THE INVENTION

The invention relates to an apparatus and method to control access to logical volumes disposed in an information storage and retrieval system.

BACKGROUND OF THE INVENTION

In hierarchical computer storage systems, fast and intensively used storage are paired with arrays of slower and less frequently accessed data devices. One example of high-speed, expensive memory is a direct access storage device file buffer (DASD). Slower storage devices include tape drives and disk drive arrays. Such tape drives and/or disk drive arrays are often located in an information storage and retrieval system, sometimes referred to as an automated media storage library.

Information storage and retrieval systems are known for providing cost effective access to large quantities of stored information, such as backup computer files. Generally, such information storage and retrieval systems include information storage media, such as a plurality of tape cartridges, a plurality of optical cartridges, a plurality of disk arrays, a plurality of electronic storage media, and the like. By electronic storage media, Applicants mean a device such as a PROM, EPROM, EEPROM, Flash PROM, and the like. A number of different companies manufacture automated media storage libraries today, each model displaying various different features. One example is the IBM TotalStorage® Enterprise Storage Server.

Storage area networks (SANs) are dedicated networks that connect one or more hosts or servers to storage devices and subsystems, such as an automated media library. SANs may utilize an appliance, such as a networked attached storage device ("NASD") to provide for management of the SAN.

What is needed is a method to control access to logical volumes disposed in an information storage and retrieval system, where multiple host computers owned by differing persons have access rights to one or more of those logical volumes.

SUMMARY OF THE INVENTION

Applicants' invention includes an apparatus and method to control access to logical volumes disposed in an information storage and retrieval system. The method provides an information storage and retrieval system comprising a plurality of logical volumes, and a plurality of host computers, where each host computer is capable of communicating with the information storage and retrieval system.

Applicants' method forms (N) host computer groups, assigns one or more of the plurality of host computers to the (i)th host computer group, where (i) is greater than or equal to 1 and less than or equal to (N), such that each host computer assigned to (i)th host computer group is not assigned to any other of the (N) host computer groups. Applicants' method forms (N) logical volume groups, assigns one or more of the plurality of logical volumes to the (i)th logical volume group, such that each of said logical volumes assigned to the (i)th logical volume group is not assigned to any other of the (N) logical volume groups.

The method maintains a database associating the (i)th host computer group with the (i)th logical volume group, and permits each of the one or more host computers assigned to the (i)th host computer group to access each logical volume comprising the (i)th logical volume group.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 2A:
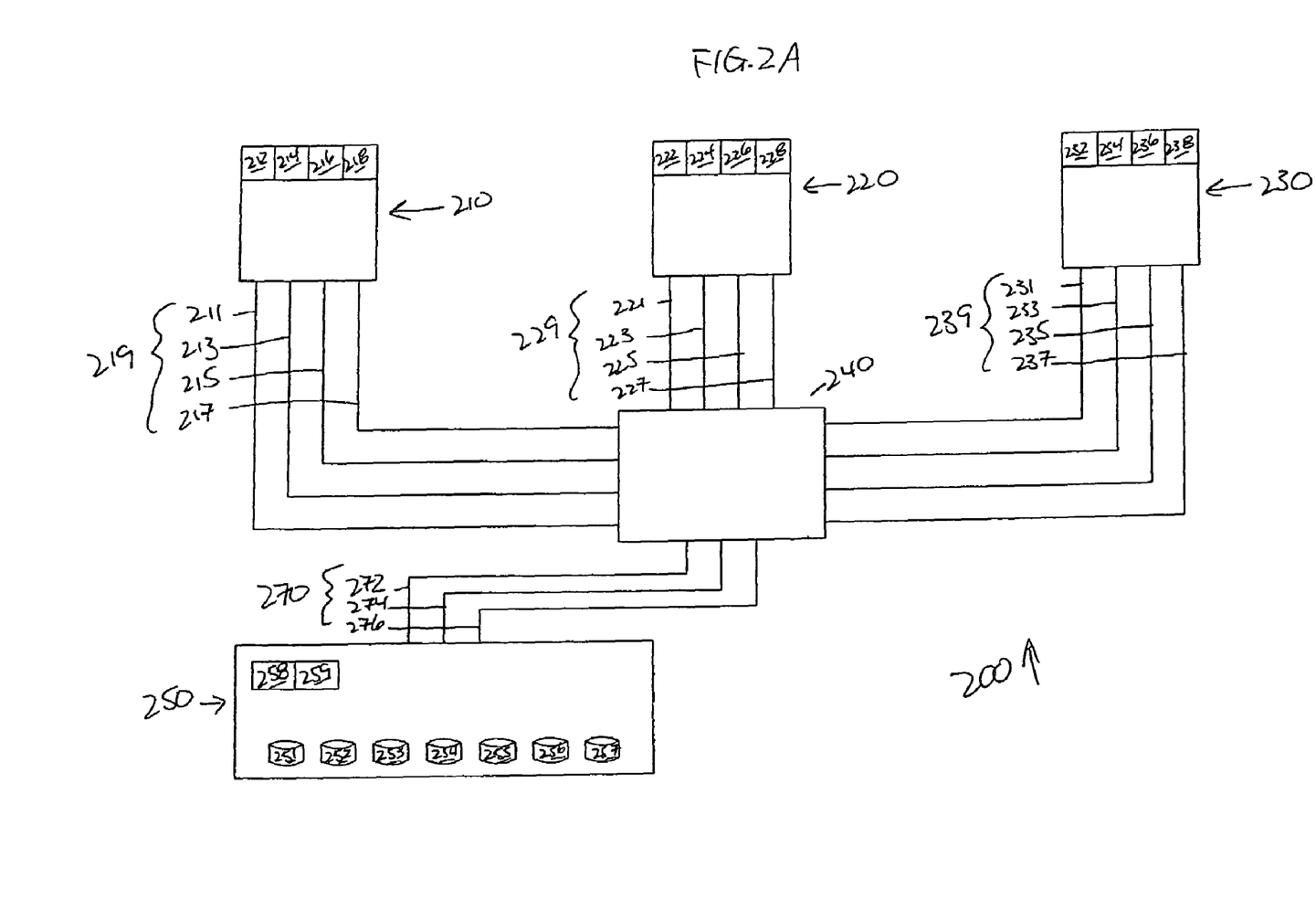
FIG. 2A is a block diagram of one embodiment of Applicants' data processing system.

Referring to the illustrations, like numerals correspond to like parts depicted in the Figures. FIG. 2A shows one embodiment of Applicants' data processing system. In the illustrated embodiment of FIG. 2A, system 200 includes a first host computer 210, a second host computer 220, and a third host computer 230. Each of the first, second, and third host computers is interconnected with a storage area network ("SAN") 240. SAN 240 is interconnected with information storage and retrieval system 250.

Figure 2B:
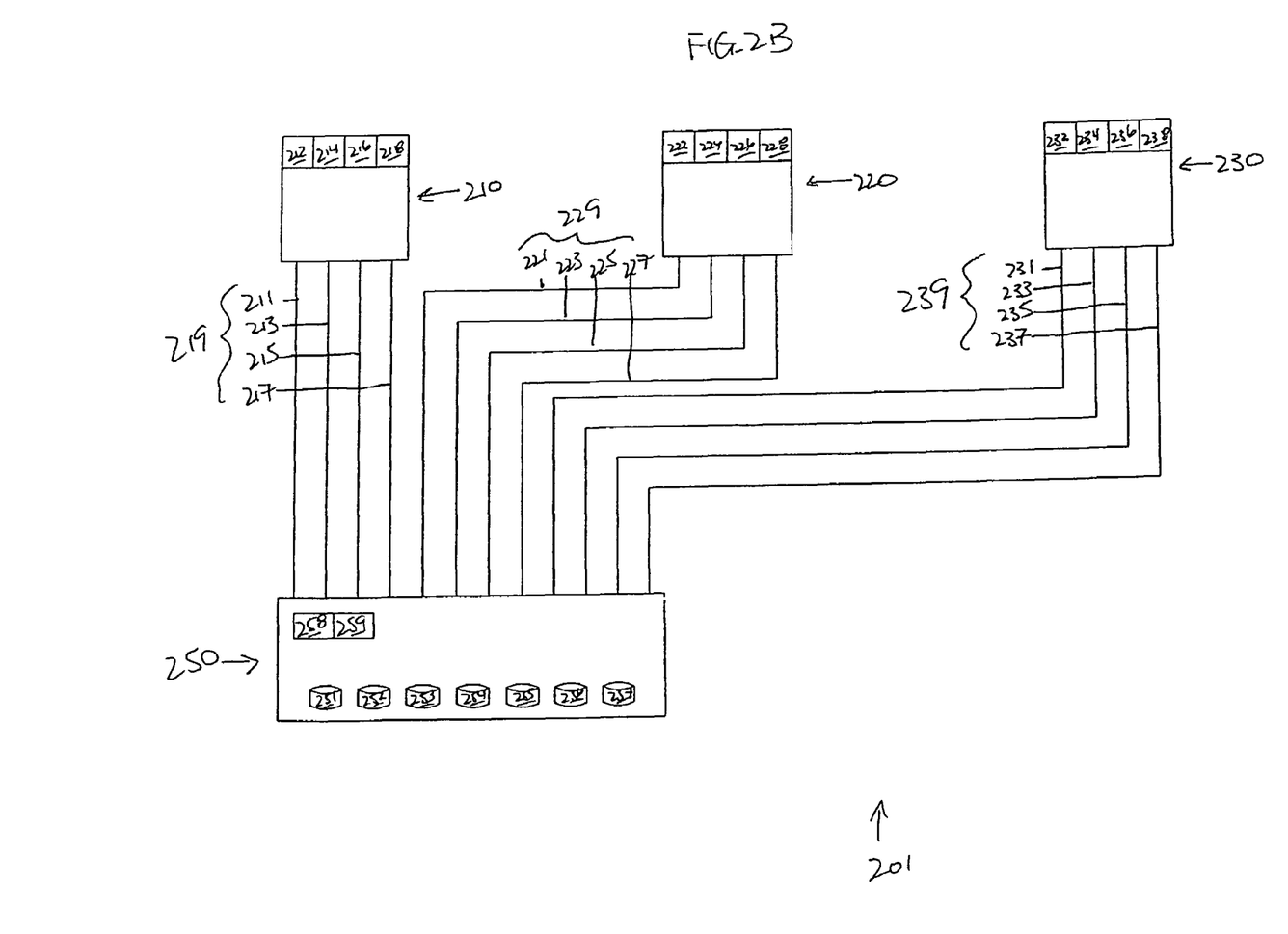
FIG. 2B is a block diagram of a second embodiment of Applicants' data processing system.

FIG. 2B shows another embodiment of Applicants' data processing system. In the illustrated embodiment of FIG. 2B, system 201 includes a first host computer 210, a second host computer 220, a third host computer 230, and information storage and retrieval system 250. Each of the first, second, and third host computers is interconnected with information storage and retrieval system 250.

In certain embodiments, Applicants' data processing system includes one or more host computers that communicate with information storage and retrieval system 250 via a SAN as illustrated in FIG. 2A, in combination with one or more host computers that communicate with information storage and retrieval system 250 directly as illustrated in FIG. 2B.

The illustrated embodiments of FIGS. 2A and 2B include three host computers. In other embodiments, Applicants' data processing systems 200/201 include two host computers. In other embodiments, Applicants' data processing systems 200/201 include more than three host computers.

Host computer 210 comprises a computer system, such as a mainframe, personal computer, workstation, and combinations thereof, including an operating system 212 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 210 further includes a second operating system 218 such as, for example, Windows, AIX, Unix, MVS, LINUX, etc.

In certain embodiments, host computer 210 includes a storage management program 214. The storage management program 214 in the host computer 210 may include the functionality of storage management type programs known in the art that manage the transfer of data to a data storage and retrieval system, such as the IBM DFSMS implemented in the IBM MVS operating system.

Storage management program 214 may include known storage management program functions, such as recall and migration. The storage management program 214 may be implemented within the operating system 212 of the host computer 210 or as a separate, installed application program 216. Alternatively, storage management program 214 may include device drivers, backup software, application programs 216, and the like.

Host computer 220 comprises a computer system, such as a mainframe, personal computer, workstation, and combinations thereof, including an operating system 222 such as Windows, AIX, Unix, MVS, LINUX, etc. In certain embodiments, host computer 220 further includes a second operating system 228 such as, for example, Windows, AIX, Unix, MVS, LINUX, etc.

In certain embodiments, host computer 220 includes a storage management program 224. The storage management program 224 in the host computer 220 may include the functionality of storage management type programs known in the art that manage the transfer of data to a data storage and retrieval system, such as the IBM DFSMS implemented in the IBM MVS operating system.

Storage management program 224 may include known storage management program functions, such as recall and migration. The storage management program 224 may be implemented within the operating system 222 of the host computer 220 or as a separate, installed application program 226. Alternatively, storage management program 214 may include device drivers, backup software, application programs 226, and the like.

Host computer 230 comprises a computer system, such as a mainframe, personal computer, workstation, and combinations thereof, including an operating system 232 such as Windows, AIX, Unix, MVS, LINUX, etc. In certain embodiments, host computer 230 further includes a second operating system 238 such as, for example, Windows, AIX, Unix, MVS, LINUX, etc.

In certain embodiments, host computer 230 includes a storage management program 234. The storage management program 234 in the host computer 230 may include the functionality of storage management type programs known in the art that manage the transfer of data to a data storage and retrieval system, such as the IBM DFSMS implemented in the IBM MVS operating system.

Storage management program 234 may include known storage management program functions, such as recall and migration. The storage management program 234 may be implemented within the operating system 232 of the host computer 210 or as a separate, installed application program 236. Alternatively, storage management program 234 may include device drivers, backup software, application programs 236, and the like.

In the illustrated embodiment of FIG. 2A, host computer 210 is capable of communicating with SAN 240 via a plurality of communication links 219. In the illustrated embodiment of FIG. 2A, plurality of communication links 219 includes communication links 211, 213, 215, and 217. In other embodiments, host computer 210 is capable of communicating with SAN 240 via fewer than four communication links. In other embodiments, host computer 210 is capable of communicating with SAN 240 via more than four communication links. In certain embodiments, communication links 211, 213, 215, and 217, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2A, host computer 220 is capable of communicating with SAN 240 via a plurality of communication links 229. In the illustrated embodiment of FIG. 2A, plurality of communication links 229 includes communication links 221, 223, 225, and 227. In other embodiments, host computer 220 is capable of communicating with SAN 240 via fewer than four communication links. In other embodiments, host computer 220 is capable of communicating with SAN 240 via more than four communication links. In certain embodiments, communication links 221, 223, 225, and 227, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2A, host computer 230 is capable of communicating with SAN 240 via a plurality of communication links 239. In the illustrated embodiment of FIG. 2A, plurality of communication links 239 includes communication links 231, 233, 235, and 237. In other embodiments, host computer 230 is capable of communicating with SAN 240 via fewer than four communication links. In other embodiments, host computer 230 is capable of communicating with SAN 240 via more than four communication links. In certain embodiments, communication links 231, 233, 235, and 237, are each selected from the group consisting of a serial interconnection, such as RS-232 or RS-422, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

SAN 240 comprises a storage area network, and is capable of communicating with information storage and retrieval system 250 via a plurality of communication links 270. In the illustrated embodiment of FIG. 2A, plurality of communication links 270 includes communication links 272, 274, and 276. In other embodiments, plurality of communication links 270 includes fewer than three communication links. In other embodiments, plurality of communication links 270 includes more than three communication links. In certain embodiments, communication links 272, 274, and 276, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/internet Protocol (TCP/IP), the Internet, or other interconnections and/or protocols as is known to those of skill in the art.

In the illustrated embodiment of FIG. 2B, host computer 210 is capable of communicating with information storage and retrieval system 250 via a plurality of communication links 219. In the illustrated embodiment of FIG. 2B, plurality of communication links 219 includes communication links 211, 213, 215, and 217. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 211, 213, 215, and 217, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2B, host computer 220 is capable of communicating with information storage and retrieval system 250 via a plurality of communication links 229. In the illustrated embodiment of FIG. 2B, plurality of communication links 229 includes communication links 221, 223, 225, and 227. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 221, 223, 225, and 227, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiment of FIG. 2B, host computer 230 is capable of communicating with information storage and retrieval system 250 via a plurality of communication links 239. In the illustrated embodiment of FIG. 2B, plurality of communication links 239 includes communication links 231, 233, 235, and 237. In other embodiments, host computer 210 is capable of communicating with information storage and retrieval system 250 via fewer than four communication links. In other embodiments, host computer 210 is capable of communicating with information storage and retrieval system 250 via more than four communication links. In certain embodiments, communication links 231, 233, 235, and 237, are each selected from the group consisting of an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, or other interconnections and/or protocols as is known to those of skill in the art.

In the illustrated embodiments of FIGS. 2A and 2B, information storage and retrieval system 250 is shown further including logical volumes 251, 252, 253, 254, 255, 256, and 257. In other embodiments, information storage and retrieval system 250 comprises more than seven logical volumes. Information storage and retrieval system 250 further includes controller 258 and non-volatile memory 259.

In certain embodiments, the logical volumes disposed in information storage and retrieval system 250 are written to one or more DASD devices. In certain embodiments, the logical volumes disposed in information storage and retrieval system are written to one or more hard disks. In certain embodiments, the logical volumes disposed in information storage and retrieval system are written to one or more hard disks, where those hard disks are configured in one or more hard disk arrays. In certain embodiments, the logical volumes disposed in information storage and retrieval system are written to one or more magnetic tapes.

In certain embodiments, Applicants' information storage and retrieval system 250 comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, Applicants' information storage and retrieval system 250 comprises a virtual tape system. U.S. Pat. No. 6,269,423, assigned to the common assignee herein, describes such a virtual tape system, and is hereby incorporated by reference. In certain embodiments, Applicants' information storage and retrieval system 250 comprises information storage and retrieval system 100 (FIG. 1).

Figure 1:
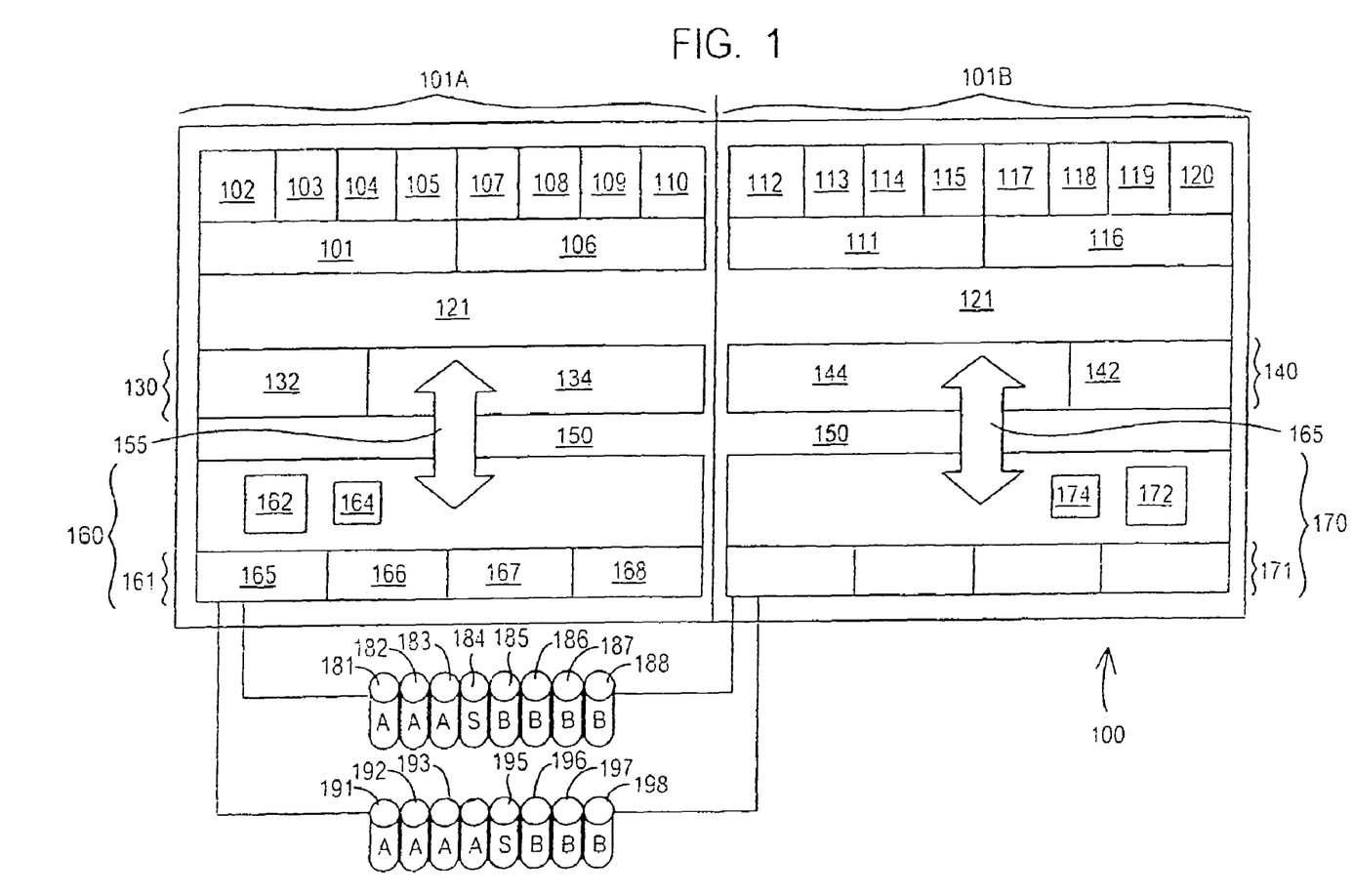
FIG. 1 is a block diagram showing the components of one embodiment of Applicants' information storage and retrieval system.

Referring now to FIG. 1, Applicants' information storage and retrieval system 100 includes a first cluster 101A and a second cluster 101B. Each cluster includes a processor portion 130/140 and an input/output portion 160/170. Internal PCI buses in each cluster are connected via a Remote I/O bridge 155/165 between the processor portions 130/140 and I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, FICON ports, ESCON ports, or SCSI ports. Other embodiments may have host adapters comprising ports supporting other protocols known to those skilled in the art. Each host adapter is connected to both clusters through one or more Common Platform Interconnect buses 121 and 150 such that each cluster can handle I/O from any host adapter.

Processor portion 130 includes processor 132 and cache 134. Processor portion 140 includes processor 142 and cache 144. I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two disk arrays, namely array "A" and array "B". In certain embodiments, hard disk arrays "A" and "B" utilize a RAID protocol. As those skilled in the art will appreciate, a RAID (Redundant Array of Independent Disks) rank combines multiple inexpensive disk drives into an array of disk drives to obtain performance, capacity and reliability that exceeds that of a single large drive.

In certain embodiments, arrays "A" and "B" comprise what is sometimes called a JBOD array, i.e. "*Just a Bunch Of Disks*" where the array is not configured according to RAID. The illustrated embodiment of FIG. 1 shows two hard disk arrays. In other embodiments, Applicants' information storage and retrieval system includes more than two hard disk arrays.

Hard disk array "A" includes disk drives 181, 182, 183, 184, 191, 192, and 193. Hard disk array "B" includes disk drives 185, 186, 187, 188, 195, 196, 197, and 198. In the illustrated embodiment of FIG. 1, each loop includes at least two spare disks, namely disks 184 and 195. Each of the hard disk arrays includes one of those spare disks.

Referring again to FIGS. 2A and 2B, in certain embodiments, host computer 210 is owned by a first person. In certain embodiments, host computer 220 is owned by a second person. In certain embodiments, host computer 230 is owned by a third person. In certain embodiments, two or more of the first person, the second person, and/or the third person, differ. As those skilled in the art will appreciate, it is desirable to limit access by, for example, the first person to only logical volumes comprising information owned by that first person. Similarly, it is desirable to limit access by the second person and by the third person to logical volumes comprising information owned by that second person or third person, respectively.

In certain embodiments, the storage system which includes information storage and retrieval system 250, and optionally one or more storage area networks, such as storage area network 240, is owned by a fourth person. In certain embodiments, that fourth person differs from the first person, the second person, and/or the third person. In order to limit the access by the first person, and/or the second person, and/or the third person, to some but not all the logical volumes disposed in information storage and retrieval system 250, the fourth person must implement an apparatus and method to control access to the logical volumes disposed in information storage and retrieval system 250.

Figure 3:
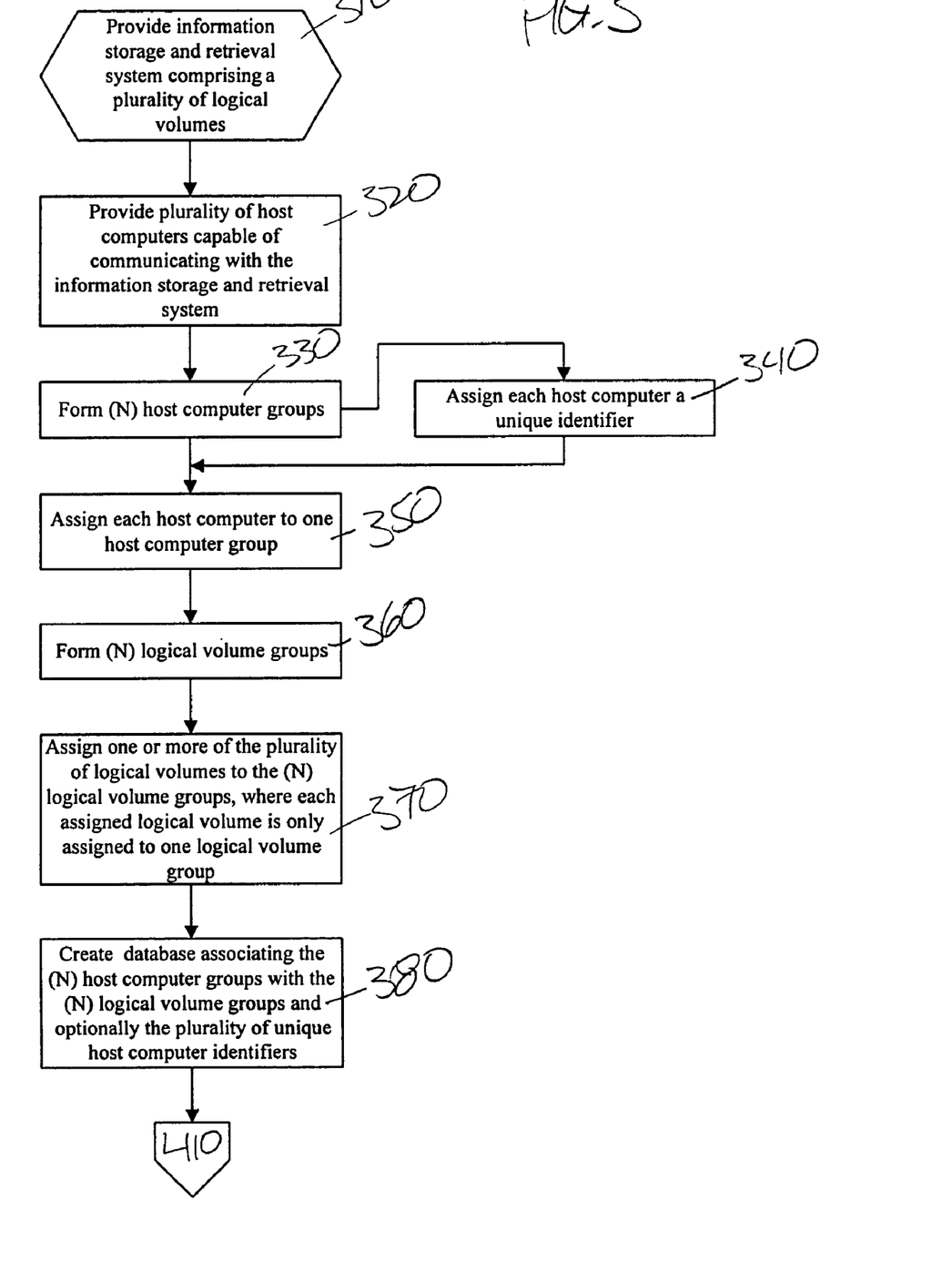
FIG. 3 is a flow chart summarizing the initial steps of Applicants' method.

Applicants' invention includes a method to control access to logical volumes disposed in an information storage and retrieval system. FIG. 3 summarizes certain initial steps in Applicants' method.

Referring now to FIG. 3, in step 310 Applicants' method provides an information storage and retrieval system, such as system 250 (FIG. 2), where that information storage and retrieval system includes a plurality of logical volumes, such as plurality of logical volumes 262, 264, 266, 268, 272, 274, 276.

In step 320, Applicant's method provides a plurality of host computers, such as host computer 210, 220, 230, where each of those host computers are capable of communicating with the information storage and retrieval system.

In step 330, Applicant's method forms (N) host computer groups, where (N) is equal to or greater than 1. In certain embodiments, one or more of those host computer groups includes one host computer. In certain embodiments, one or more of those host computer groups includes two or more host computers. In certain embodiments, step 330 is performed by a storage system owner and/or operator, such as the owner and/or operator of information storage and retrieval system 250 (FIG. 2). In certain embodiments, step 330 is performed by a controller, such as controller 258, disposed in Applicants' information storage and retrieval system.

In certain embodiments, Applicants' method includes step 340 wherein the method creates and assigns a unique and persistent identifier to each of the plurality of interconnected host computers. In certain embodiments, the unique identifier assigned to a host computer in step 340 comprises a World Wide Node Name. In certain embodiments, the unique identifier assigned to a host computer in step 340 comprises one or more World Wide Port Name.

In certain embodiments, Applicants' method assigns to each host computer one or more World Wide Port Names ("WWPNs"), where each I/O port disposed in that host computer could be assigned a different WWPN. Thus, a host computer comprising (M) ports could be assigned (M) different WWPNs. Using these prior art methods, host computer 210 could comprise four different WWPNs, i.e. a different WWPN for each of adapters 211, 213, 215, and 217.

In certain embodiments, step 340 is performed by a storage system owner and/or operator, such as the owner and/or operator of information storage and retrieval system 250 (FIG. 2). In certain embodiments, step 340 is performed by a controller, such as controller 258, disposed in Applicants' information storage and retrieval system.

In step 350, Applicants' method assigns each host computer capable of communicating with the information storage and retrieval system to one of the (N) host computer groups. In certain embodiments, step 350 is performed by a storage system owner and/or operator, such as the owner and/or operator of information storage and retrieval system 250 (FIG. 2). In certain embodiments, step 350 is performed by a controller, such as controller 258, disposed in Applicants' information storage and retrieval system.

In step 360, Applicants' method forms (N) logical volume groups. In certain embodiments, step 360 is performed by a storage system owner and/or operator, such as the owner and/or operator of information storage and retrieval system 250 (FIG. 2). In certain embodiments, step 330 is performed by a controller, such as controller 258, disposed in Applicants' information storage and retrieval system.

In step 370, Applicants' method assigns one or more of the plurality of logical volumes of step 310 to one or more of the (N) logical volume groups of step 360, such that each assigned logical volume is assigned to a single logical volume group. In certain embodiments, step 370 is performed by a storage system owner and/or operator, such as the owner and/or operator of information storage and retrieval system 250 (FIG. 2). In certain embodiments, step 370 is performed by a controller, such as controller 258, disposed in Applicants' information storage and retrieval system. In the event one or more logical volumes are not assigned to any of the (N) logical volumes groups, then those volumes remain "unassigned."

In step 380, Applicants' method maintains a database, where that database associates each of the (N) host computer groups with the corresponding logical volume group. In certain embodiments, the database of step 380 also associates each unique identifier assigned in step 340 to one of the (N) host computer groups. In certain embodiments, the database of step 380 is saved in non-volatile memory, such as memory 259, disposed in Applicants' information storage and retrieval system.

Figure 4:
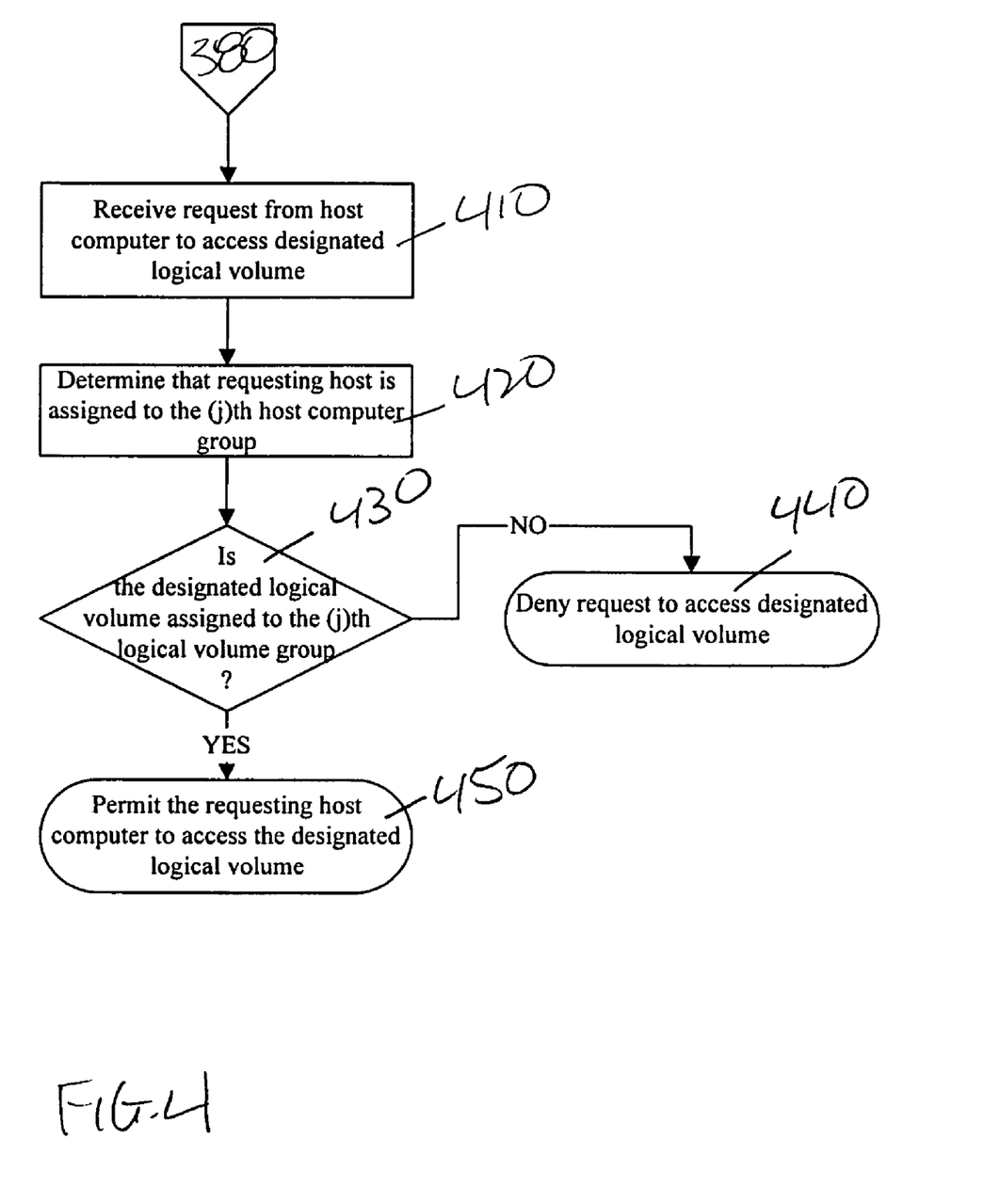
FIG. 4 is a flow chart summarizing certain additional steps of Applicants' method.

Applicants' method transitions from step 380 to step 410 (FIG. 4). FIG. 4 summarizes additional steps in Applicants' method to control access to the plurality of logical volumes disposed on Applicants' information storage and retrieval system 250 (FIG. 2). Referring now to FIG. 4, in step 410 Applicants' information storage and retrieval system, such as system 200 (FIG. 2A)/201 (FIG. 2B), receives a request from an interconnected host computer, such as host computer 210 (FIG. 2), to access a designated logical volume, such as logical volume 262 (FIG. 2).

In certain embodiments, the request of step 410 includes addressing information that Applicants' information storage and retrieval system uses to determine the unique identifier assigned to the requesting host in step 340 (FIG. 3). In embodiments wherein the requesting host communicates with Applicants' information storage and retrieval system via a Fibre Channel link, the relationship between the unique identifier assigned in step 340 and the Fibre Channel link address is established through a Fibre Channel login process.

In step 420, Applicants' method determines that the requesting host is assigned to the (j)th host computer group, wherein (j) is greater than or equal to 1 and less than or equal to (N). In certain embodiments, step 420 is performed by a controller, such as controller 258 (FIG. 2), disposed in Applicants' information storage and retrieval system, such as system 250 (FIG. 2).

Applicants' method transitions from step 420 to step 430 wherein the method determines if the designated logical volume of step 410 is assigned to the (j)th logical volume group. In certain embodiments, step 420 is performed by a controller, such as controller 258 (FIG. 2), disposed in Applicants' information storage and retrieval system, such as system 250 (FIG. 2).

If Applicants' method determines in step 430 that the designated logical volume of step 410 is assigned to the (j)th logical volume group, then the method transitions to step 450 wherein the method permits the requesting host computer, assigned to the (j)th host computer group, to access the designated logical volume which is assigned to the (jth logical volume group. Alternatively, if Applicants' method determines in step 430 that the designated logical volume of step 410 is not assigned to the (j)th logical volume group, then the method transitions to step 440 wherein the method does not permit the requesting host computer, assigned to the (j)th host computer group, to access the designated logical volume which is not assigned to the (j)th logical volume group.

Figure 5:
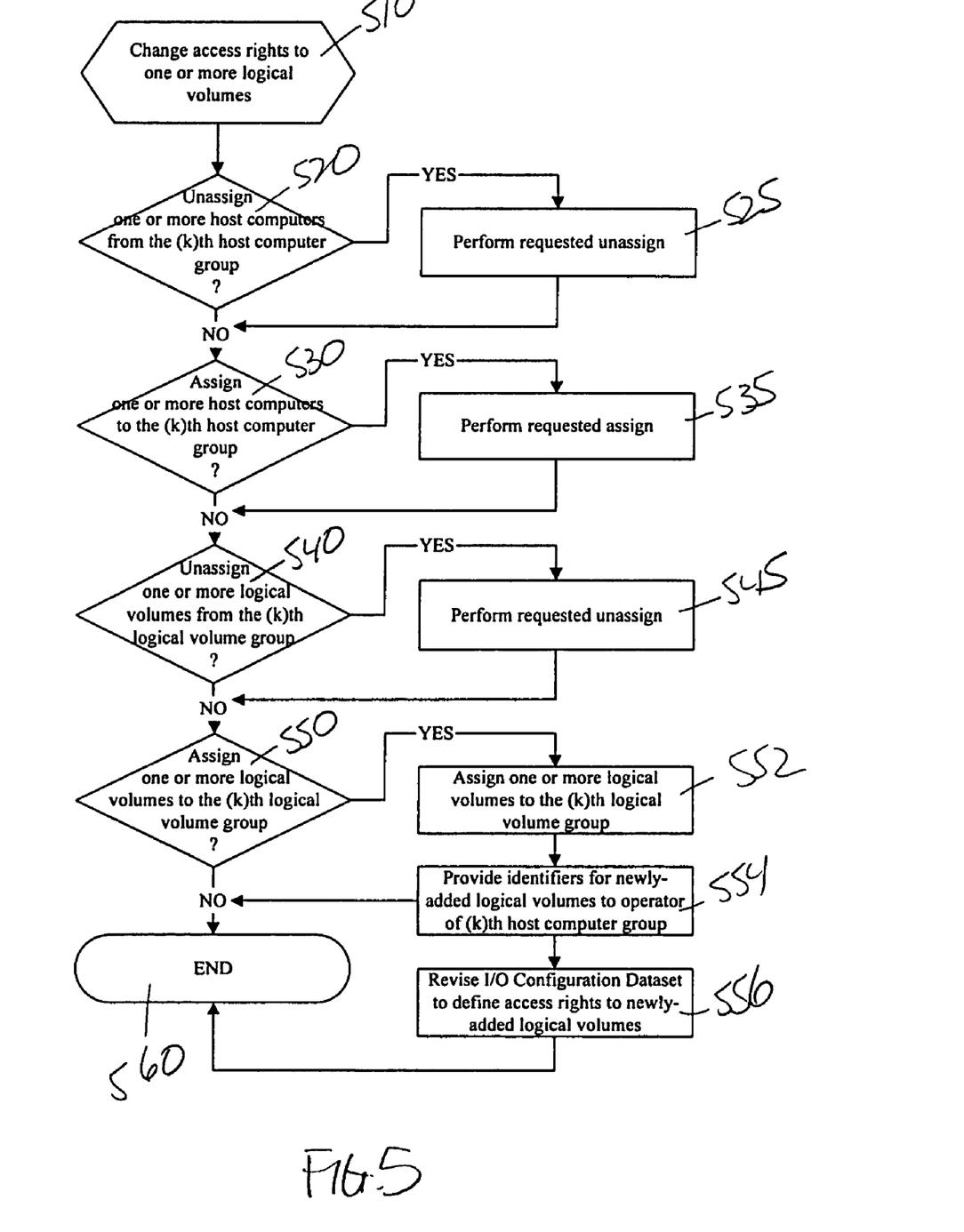
FIG. 5 is a flow chart summarizing certain additional steps of Applicants' method.

FIG. 5 summarizes additional steps in Applicants' method, wherein access rights to one or more logical volumes is changed. Referring now to FIG. 5, in certain embodiments step 510 includes receiving a request made by the owner/operator of a host computer group by the owner of the storage system.

The request of step 510 may include assigning and/or unassigning one or more host computers from a host computer group, and/or assigning and/or unassigning one or more logical volumes from a logical volume group. The steps of Applicants' method summarized in FIG. 5 are used to change the access rights to logical volumes disposed in an information storage and retrieval system, where those logical volumes are not in a copy services relationship, and where parallel access volumes are not used.

Controlling access rights to logical volumes where one or more of those logical volumes may be in a copy services relationship is described in an application entitled "Apparatus and Method to Control Access to Logical Volumes Using Copy Services", filed on even date herewith and assigned to common assignee hereof. Controlling access rights to logical volumes where one or more of those logical volumes comprises a base logical volume for one or more parallel access volumes is described in an application entitled "Apparatus and Method to Control Access to Logical Volumes Using Parallel Access Volumes", filed on even date herewith and assigned to common assignee hereof.

In response to a request to change access rights, Applicants' method transitions to step 520 wherein the method determines if the request includes unassigning one or more host computers from a host computer group, such as for example the (k)th host computer group, where that request is made by the owner/operator of the (k) host computer group. If Applicants' method determines in step 520 that the owner/operator of the (k)th host computer group does not request that one or more host computers currently assigned to the (k)th host compute group be unassigned, then the method transitions from step 520 to step 530. If Applicants' method determines in step 520 that the owner/operator of the (k)th host computer group requests that one or more host computers currently assigned to the (k)th host computer group be unassigned, then the method transitions from step 520 to step 525 wherein the method unassigns those one or more host computers. In certain embodiments, step 525 is performed by the, owner/operator of the storage system.

Applicants' method transitions from step 525 to step 530, wherein the method determines if the owner/operator of the (k)th host computer group requests that one or more additional host computers be assigned to the host computer group. If Applicants' method determines in step 530 that the owner/operator of the (k)th host computer group does not request that one or more additional host computers be assigned to the host computer group, then Applicants' method transitions from step 530 to step 540. Alternatively, if Applicants' method determines in step 530 that the owner/operator of the (k)th host computer group requests that one or more additional host computers be assigned to the host computer group, then Applicants' method transitions to step 535 wherein the method assigns those one or more additional host computers to the (k)th host computer group. In certain embodiments, step 535 is performed by the owner/operator of the storage system.

Applicants' method transitions from step 535 to step 540, wherein the method determines if the owner/operator of the (k)th host computer group requests that one or more logical volumes assigned to the (k)th logical volume group be unassigned. If Applicants' method determines in step 540 that the owner/operator of the (k)th host computer group does not request one or more logical volumes assigned to the (k)th logical volume group be unassigned, then Applicants' method transitions from step 540 to step 550. Alternatively, if Applicants' method determines in step 540 that the owner/operator of the (k)th host computer group requests that one or more logical volumes assigned to the (k)th logical volume group be unassigned, then Applicants' method transitions to step 545 wherein the method unassigns those one or more logical volumes from the (k)th logical volume group. In certain embodiments, step 535 is performed by the owner/operator of the storage system.

Applicants' method transitions from step 545 to step 550, wherein the method determines if the owner/operator of the (k)th host computer group requests that one or more logical volumes be assigned to the (k)th logical volume group. If Applicants' method determines in step 550 that the owner/operator of the (k)th host computer group does not request that one or more logical volumes be assigned to the (k)th logical volume group, then Applicants' method transitions from step 550 to step 560 and ends.

Alternatively, if Applicants' method determines in step 550 that the owner/operator of the (k)th host computer group requests that one or more logical volumes be assigned to the (k)th logical volume group, then Applicants' method transitions to step 552 wherein the method assigns one or more logical volumes to the (k)th logical volume group. In certain embodiments, step 552 is performed by the owner/operator of the storage subsystem. Applicants' method transitions from step 552 to step 554 wherein the storage system owner/operator assigns identifiers to the logical volumes assigned in step 552, and provides those identifiers to the owner/operator of the (k)th host computer system. In certain embodiments, Applicants' method transitions from step 554 to step 560 and ends.

In certain embodiments, a host computer assigned to the (k)th host computer group can utilize an auto configuration process or discovery techniques to locate the logical volumes newly-added to the (k)th logical volume group. In other embodiments, Applicants' method includes step 556 wherein the owner/operator of the (k)th host computer group revises the (k)th host computer Input/Output Control Dataset ("IO- CDS") to define access rights to the newly-assigned logical volumes of step 552. Applicants' method transitions from step 556 to step 560 and ends.

The embodiments of Applicants' method recited in FIGS. 3, 4, and/or 5, may be implemented separately. Moreover, in certain embodiments, individual steps recited in FIGS. 3, 4, and/or 5, may be combined, eliminated, or reordered.

In certain embodiments, Applicants' invention includes instructions residing in non-volatile memory 259 (FIG. 2), where those instructions are executed by controller 258 (FIG. 2) to performs steps 330, 340, 350, 360, 370, and 380 in FIG. 3, and/or steps 410 through 450 recited in FIG. 4, and/or steps 520 through 560 recited in FIG. 5. In other embodiments, Applicants' invention includes instructions residing in any other computer program product, where those instructions are executed by a computer external to, or internal to, system 200 (FIG. 2A)/201 (FIG. 2B), to perform steps 330, 340, 350, 360, 370, and 380 in FIG. 3, and/or steps 410 through 450 recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to control access to logical volumes disposed in an information storage and retrieval system, comprising the steps of:
    providing an information storage and retrieval system comprising a plurality of logical volumes, wherein said information storage and retrieval system is owned by a storage system owner;
    providing a plurality of host computers, wherein each of said plurality of host computers comprises a storage management program, a first operating system, and a second operating system, and is capable of communicating with said information storage and retrieval system, wherein each of said plurality of host computers are owned by different host computer owners, and wherein those different host computer owners differ from said storage system owner;
    forming by said storage system owner (N) host computer groups, wherein (N) is greater than or equal to 1;
    assigning by said storage system owner each of said plurality of host computers to one of the (N) host computer groups;
    forming by said storage system owner (N) logical volume groups;
    assigning by said storage system owner one or more of said plurality of logical volumes to the (i)th logical volume group, wherein (i) is greater than or equal to 1 and less than or equal to (N), and wherein any logical volumes not assigned to any of the (N) logical volume groups remain unassigned;
    maintaining a database associating the (i)th host computer group with the (i)th logical volume group;
    permitting each of said one or more host computers assigned to the (i)th host computer group to access each logical volume comprising said (i)th logical volume group;
    wherein each of said plurality of host computers assigned to (i)th host computer group is not assigned to any other of the (N) host computer groups, and wherein each of said logical volumes assigned to the (i)th logical volume group is not assigned to any other of the (N) logical volume groups.

2. The method of claim 1, wherein one or more of said (N) host computer groups are owned by a first person, and wherein one or more of said (N) host computer groups are owned by a second person, wherein said first person differs from said second person.

3. The method of claim 1, further comprising the step of providing a storage area network, wherein said storage area network is capable of communicating with said information storage and retrieval system and with each of said plurality of host computers.

4. The method of claim 1, further comprising the steps of:
    forming a plurality of unique identifiers;
    assigning a different one of said plurality of unique identifiers to each of said plurality of host computers;
    associating in said database each of said plurality of unique identifiers with one of said (N) host computer groups.

5. The method of claim 4, further comprising the steps of:
    requesting by one of said plurality of host computers to access a designated logical volume;
    determining that said requesting host computer is assigned to the (j)th host computer group, wherein (j) is greater than or equal to 1 and less than or equal to (N);
    determining if said designated logical volume is assigned to the (j)th logical volume group;
    operative if said designated logical volume is assigned to the (j)th logical volume group, permitting said requesting host to access said designated volume;
    operative if said designated logical volume is not assigned to the (j)th logical volume group, denying said requesting host access to said designated volume.

6. The method of claim 5, further comprising the steps of:
    establishing the unique identifier assigned to said requesting host computer;
    determining that the requesting host computer is assigned to the (j)th logical volume group.

7. The method of claim 1, further comprising the steps of:
    receiving a request to assign one or more host computers to the (k)th logical volume group, wherein (k) is greater than or equal to 1 and less than or equal to (N);
    assigning said one or more host computers to the (k)th logical volume group.

8. The method of claim 1, further comprising the steps of:
    receiving a request to unassign one or more host computers from the (k)th logical volume group, wherein (k) is greater than or equal to 1 and less than or equal to (N);
    unassigning said one or more host computers to the (k)th logical volume group.

9. The method of claim 1, further comprising the steps of:
    receiving a request to unassign one or more logical volumes from the (k)th logical volume group, wherein (k) is greater than or equal to 1 and less than or equal to (N);
    unassigning said one or more logical volumes from the (k)th logical volume group.

10. The method of claim 1, further comprising the steps of:
    receiving a request to assign one or more logical volumes to the (k)th logical volume group, wherein (k) is greater than or equal to 1 and less than or equal to (N);

assigning said one or more logical volumes to the (k)th logical volume group;

assigning identifiers to said one or more logical volumes newly-assigned to the (k)th logical volume group.

11. An information storage and retrieval system comprising a computer readable medium having computer readable program code disposed therein to control access to logical volumes disposed therein, wherein said information storage and retrieval system is owned by a storage system owner, wherein said information storage and retrieval system comprises a plurality of logical volumes, and wherein a plurality of host computers, is capable of communicating with said information storage and retrieval system, wherein each host computer comprises a storage management program, a first operating system, and a second operating system, wherein each of said plurality of host computers are owned by different host computer owners, and wherein those different host computer owners differ from said storage system owner, the computer readable program code comprising a series of computer readable program steps to effect:

forming (N) host computer groups, wherein (N) is greater than or equal to 1;

assigning each of said plurality of host computers to one of the (N) host computer groups;

forming (N) logical volume groups;

assigning one or more of said plurality of logical volumes to the (i)th logical volume group, wherein (i) is greater than or equal to 1 and less than or equal to (N)), and wherein any logical volumes not assigned to any of the (N) logical volume groups remain unassigned;

maintaining a database associating the (i)th host computer group with the (i)th logical volume group;

permitting each of said one or more host computers assigned to the (i)th host computer group to access each logical volume comprising said (i)th logical volume group;

wherein each of said plurality of host computers assigned to (i)th host computer group is not assigned to any other of the (N) host computer groups, and wherein each of said logical volumes assigned to the (i)th logical volume group is not assigned to any other of the (N) logical volume groups.

12. The information storage and retrieval system of claim 11, wherein one or more of said (N) host computer groups are owned by a first person, and wherein one or more of said (N) host computer groups are owned by a second person, wherein said first person differs from said second person.

13. The information storage and retrieval system of claim 11, wherein a storage area network is capable of communicating with each of said plurality of host computers, said computer readable program code further comprising a series of computer readable program steps to effect receiving information from said storage area network.

14. The information storage and retrieval system of claim 11, said computer readable program code further comprising a series of computer readable program steps to effect:

forming a plurality of unique identifiers;

assigning a different one of said plurality of unique identifiers to each of said plurality of host computers;

associating in said database each of said plurality of unique identifiers with one of said (N) host computer groups.

15. The information storage and retrieval system of claim 14, said computer readable program code further comprising a series of computer readable program steps to effect:

receiving from one of said plurality of host computers a request to access a designated logical volume;

determining that said requesting host is assigned to the (j)th host computer group, wherein (j) is greater than or equal to 1 and less than or equal to (N);

determining if said designated logical volume is assigned to the (j)th logical volume group;

operative if said designated logical volume is assigned to the (j)th logical volume group, permitting said requesting host to access said designated volume;

operative if said designated logical volume is not assigned to the (j)th logical volume group, denying said requesting host access to said designated volume.

16. The information storage and retrieval system of claim 15, said computer readable program code further comprising a series of computer readable program steps to effect:

establishing the unique identifiers assigned to said requesting host computer;

determining using said database and said unique identifiers that the requesting host computer is assigned to the (j)th logical volume group.

17. The information storage and retrieval system of 11, said computer readable program code further comprising a series of computer readable program steps to effect:

receiving a request to assign one or more host computers to the (k)th logical volume group, wherein (k) is greater than or equal to 1 and less than or equal to (N);

assigning said one or more host computers to the (k)th logical volume group.

18. The information storage and retrieval system of claim 11, said computer readable program code further comprising a series of computer readable program steps to effect:

receiving a request to unassign one or more host computers from the (k)th logical volume group, wherein (k) is greater than or equal to 1 and less than or equal to (N);

unassigning said one or more host computers to the (k)th logical volume group.

19. The information storage and retrieval system of claim 11, said computer readable program code further comprising a series of computer readable program steps to effect:

receiving a request to unassign one or more logical volumes from the (k)th logical volume group, wherein (k) is greater than or equal to 1 and less than or equal to (N);

unassigning said one or more logical volumes from the (k)th logical volume group.

20. The information storage and retrieval system of claim 11, said computer readable program code further comprising a series of computer readable program steps to effect:

receiving a request to assign one or more logical volumes to the (k)th logical volume group, wherein (k) is greater than or equal to 1 and less than or equal to (N);

assigning said one or more logical volumes to the (k)th logical volume group;

assigning identifiers to said one or more logical volumes newly-assigned to the (k)th logical volume group.

21. A computer program product embodied in an information storage medium, said computer program product being executed by a programmable computer processor to control access to logical volumes disposed in an information storage and retrieval system, wherein said information storage and retrieval system is owned by a storage system owner, wherein said information storage and retrieval system comprises a plurality of logical volumes, wherein a plurality of host computers is in communication with said information storage and retrieval system, wherein each host computer comprises a storage management program, a first operating system, and a second operating system, and wherein each of said plurality of host computers are owned by different host computer owners, and wherein those different host computer owners differ from said storage system owner, comprising:

computer readable program code which causes said programmable computer processor to form (N) host computer groups, wherein (N) is greater than or equal to 1;

computer readable program code which causes said programmable computer processor to assign each of said plurality of host computers to one of the (N) host computer groups;

computer readable program code which causes said programmable computer processor to form (N) logical volume groups;

computer readable program code which causes said programmable computer processor to assign one or more of said plurality of logical volumes to the (i)th logical volume group, wherein (i) is greater than or equal to 1 and less than or equal to (N), wherein any logical volumes not assigned to any of the (N) logical volume groups remain unassigned;

computer readable program code which causes said programmable computer processor to maintaining a database associating the (i)th host computer group with the (i)th logical volume group;

computer readable program code which causes said programmable computer processor to permit each of said one or more host computers assigned to the (i)th host computer group to access each logical volume comprising said (i)th logical volume group.

22. The computer program product of claim 21 wherein one or more of said (N) host computer groups are owned by a first person, and wherein one or more of said (N) host computer groups are owned by a second person, wherein said first person differs from said second person.

23. The computer program product of claim 21 wherein a storage area network is capable of communicating with each of said plurality of host computers, further comprising computer readable program code which causes said programmable computer processor to receive information from said storage area network.

24. The computer program product of claim 21, further comprising:

computer readable program code which causes said programmable computer processor to form a plurality of unique identifiers;

computer readable program code which causes said programmable computer processor to assign a different one of said plurality of unique identifiers to each of said plurality of host computers;

computer readable program code which causes said programmable computer processor to associate in said database each of said plurality of unique identifiers with one of said (N) host computer groups.

25. The computer program product of claim 21, further comprising:

computer readable program code which causes said programmable computer processor to receive from one of said plurality of host computers a request to access a designated logical volume;

computer readable program code which causes said programmable computer processor to determine that said requesting host is assigned to the (j)th host computer group, wherein (j) is greater than or equal to 1 and less than or equal to (N);

computer readable program code which causes said programmable computer processor to determine if said designated logical volume is assigned to the (j)th logical volume group;

computer readable program code which, if said designated logical volume is assigned to the (j)th logical volume group, causes said programmable computer processor to permit said requesting host to access said designated volume;

computer readable program code which, if said designated logical volume is not assigned to the (j)th logical volume group, causes said programmable computer processor to deny said requesting host access to said designated volume.

26. The computer program product of claim 25, further comprising:

computer readable program code which causes said programmable computer processor to establish the unique identifier assigned to said requesting host computer;

computer readable program code which causes said programmable computer processor to determine using database and said unique identifier that the requesting host computer is assigned to the (j)th logical volume group.

* * * * *